United States Patent [19]

Weaver

[11] Patent Number: 4,781,286

[45] Date of Patent: Nov. 1, 1988

[54] POWER AND FREE ROLLER CONVEYOR

[75] Inventor: Richard A. Weaver, Linden, Mich.

[73] Assignee: Automated Manufacturing Systems, Inc., Fenton, Mich.

[21] Appl. No.: 929,615

[22] Filed: Nov. 12, 1986

[51] Int. Cl.[4] .............................................. B65G 13/06
[52] U.S. Cl. ..................................... 198/789; 198/619;
310/13; 310/166
[58] Field of Search ...................... 198/789, 619, 805;
310/12, 13, 166, 124, 125

[56] References Cited

U.S. PATENT DOCUMENTS

| 1,716,448 | 6/1929 | Langsdorf | 198/789 |
| 2,684,753 | 7/1954 | Kolbe et al. | 198/805 |
| 3,135,879 | 6/1964 | Baumann | 310/13 |
| 3,426,887 | 2/1969 | Ward et al. | 198/805 X |
| 3,549,966 | 12/1970 | Wilson | 310/13 X |
| 3,904,898 | 9/1975 | Mailfert | 310/12 X |
| 3,904,899 | 9/1975 | Malfert | 310/12 X |
| 3,988,658 | 10/1976 | Meinke et al. | 310/12 X |

FOREIGN PATENT DOCUMENTS 1413290  11/1975  United Kingdom ................ 198/789

OTHER PUBLICATIONS

Cory, Stanley A., "The Nature of Linear Induction Motors", Aug. 23, 1984.

Primary Examiner—Robert J. Spar
Assistant Examiner—D. Glenn Dayoan
Attorney, Agent, or Firm—Learman & McCulloch

[57] ABSTRACT

A power and free roller conveyor has a plurality of spaced rollers defining a conveyor path and to each of which is fixed a drive that comprises the secondary of a linear induction motor. The primary of the linear induction motor is positioned adjacent the drivers to enable an interaction of magnetic flux and current resulting from the propagation of a magnetic wave along the primary to cause the drivers and the rollers to rotate. The speed, torque, and direction of rotation of the rollers can be controlled by a voltage and frequency control unit.

17 Claims, 1 Drawing Sheet

POWER AND FREE ROLLER CONVEYOR

POWER AND FREE ROLLER CONVEYOR

This invention relates generally to a power and free roller conveyor driven by a linear induction motor.

BACKGROUND OF THE INVENTION

Power and free roller conveyor systems are well known in the art. Such systems typically include a plurality of rotatable cylindrical rollers supported on a frame and defining a conveyor path along which objects may be conveyed. At least some of the rollers are powered in some way to cause them to rotate about their axes and thereby impart a driving force to any object supported thereon to cause it to be conveyed in a desired direction.

In a typical prior art system, an object to be conveyed will move along the conveyor path until it engages an obstacle, such as a stop that is movable into and out of the path of travel of the object. Once movement of the object has been arrested, the rollers that support the object will stop turning, although the remaining powered rollers will continue to rotate. Upon removal of the obstacle, the arrested object will continue its movement and the previously stopped rollers again will rotate.

Most of the known power and free roller conveyor systems utilize pulleys, sprocket wheels, or other mechanical drive transmitting devices coupled to the rollers to cause them to rotate. The pulleys or sprocket wheels are driven continuously by one or more electric motors via belts, chains, or the like. A clutch mechanism conventionally is incorporated between the driving pulley or wheel and each powered roller to enable the latter to stop turning while its pulley or wheel continues rotating.

Although such prior art constructions operate reasonably well for the purposes intended, a number of disadvantages are inherent in them. For instance, the clutch mechanisms can be complicated to manufacture, expensive to assemble, and troublesome to maintain. Further, many of the known constructions have rollers that are driven in one direction of rotation and cannot easily be driven in the reverse direction. In addition, many of the prior art systems, particularly those that use chain drives, are noisy.

In one prior art construction some of the rollers are powered by electrical induction motors of the kind wherein the rollers themselves serve as the rotors for the motors. In this construction only some of the rollers are provided with such an inductive drive while many, if not most, of the other rollers are not powered. This system suffers from many disadvantages that arise through an apparent compromise in its design. On the one hand, providing a motor for each roller is costly and possibly difficult to implement since each motor will differ to some extent from the others, thereby causing speed inconsistencies, uneven power distribution, and the like. On the other hand, the failure to provide drive means for each roller may cause the system to be underpowered and unsuitable for many applications.

In another prior art construction a linear induction motor is utilized to drive the conveyor, but the conveyor is not composed of rotatable rotors. In particular, the conveyor of this prior art construction has a secondary member of a linear inductive motor affixed thereto, and the primary member is mounted in a position in which it may interact with the secondary member to impart linear motion thereto. Although a number of different embodiments of such a system have been suggested, none of them has made use of rollers.

An object of the invention is to provide a power and free conveyor that substantially avoids the deficiencies of the prior art. In particular, such a conveyor should be relatively quiet and efficient in operation, require minimal maintenance, and provide drive power to all rollers as necessary while enabling any of the driven rollers to stop turning when movement of an object supported thereon is halted. Preferably, such a system enables an operator easily to reverse the direction of rotation of the driven rollers and further enables the operator to control the torque and the speed of rotation. Finally, such a system should be relatively easy to manufacture, simple in construction, and relatively inexpensive in comparison to the benefits attained. A conveyor constructed according to the invention possesses all of these characteristics.

SUMMARY OF THE INVENTION

A power and free roller conveyor constructed according to the invention includes a linear induction motor driving system. In addition, the conveyor includes a plurality of load bearing rollers each of which has a driver attached thereto. The drivers function as secondary members that cooperate with the primary member of the linear induction motor to impart rotation to the rollers.

In the disclosed embodiments of the invention the speed with which a magnetic wave is propagated along the primary member can be adjusted to control the speed at which the rollers rotate. If desired, the direction of propagation can be reversed to enable the direction of rotation of the rollers to be reversed.

In one embodiment of the invention each roller has a cylindrical driver which effects rotation of such roller. In another embodiment of the invention each driver is tubular and has a plurality of circumferentially spaced, substantially planar surfaces formed thereon. The use of such planar surfaces allows presentation of more mass in closer proximity to the primary member than is possible with a curvilinear outer surface. As a result, greater driving torque can be applied to each roller.

THE DRAWINGS

A conveyor constructed according to the invention is disclosed in the following description and the accompanying drawings, wherein.

PREFERRED EMBODIMENTS

Figure 1:
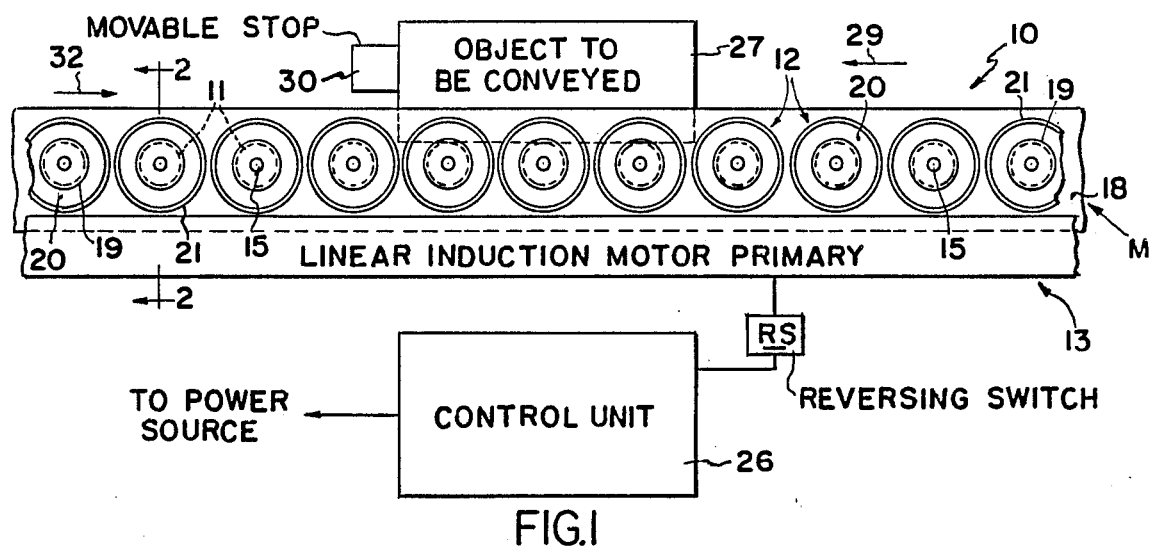
FIG. 1 is a fragmentary, side elevational view of a typical section of the conveyor.

A power and free roller conveyor according to the invention is designated generally by the numeral 10 and includes a plurality of rotatable load bearing rollers 11, a corresponding plurality of drivers 12, and the primary member 13 of a linear induction motor M.

Each roller 11 is cylindrical and is fixed to a shaft 15 that projects beyond both ends of the roller. The shaft at one end of the roller is journaled by bearings 16 in a frame member 17 and the shaft at the opposite end of the roller is journaled by similar bearings 16 in a second frame member 18 that is spaced from and parallels the frame member 17. Each roller thus may rotate freely about its own axis in response to the application of a driving force. Each of the frame members 17 and 18 is supported at a suitable level by conventional framework (not shown).

The rollers and other supporting structure should be formed of appropriate material to provide adequate support for objects to be conveyed along a path, and the rollers themselves should be of appropriate diameter and length. Further, and as is shown in FIG. 1, the rollers substantially parallel one another and are sufficiently close to one another longitudinally of the conveyor path to effect the load supporting and conveying tasks.

Figure 2:
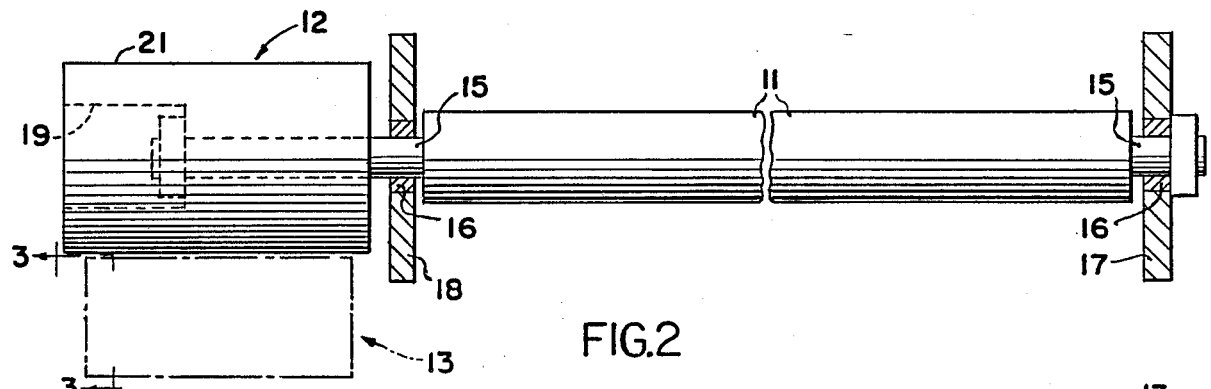
FIG. 2 is a sectional view taken on the line 2—2 of FIG. 1.
Figure 4:
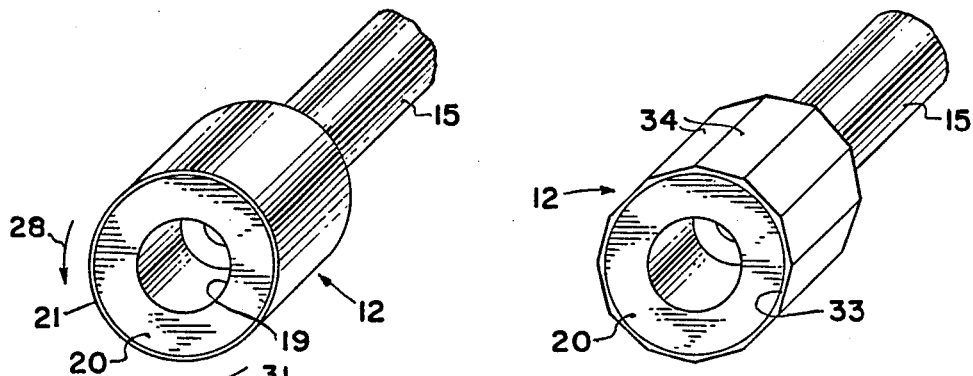
FIG. 4 is a fragmentary, isometric view of a typical roller and its driver.

As is best shown in FIGS. 2 and 4, one end of the shaft 15 of each roller extends beyond the adjacent frame member 18 and has fixed thereto one of the drivers 12. Each driver is cylindrical, coaxial with its associated roller 11, and preferably is of larger diameter than the latter. A cavity 19 may be formed in each driver to reduce its weight and facilitate attachment to the roller shaft 15. Such attachment may be effected by any known means, including various fasteners or friction retention devices.

Each driver 12 should be formed of electrically conductive, non-magnetically permeable material, such as aluminum or copper, in order to cooperate with the primary member 13 of the linear inductive motor as described below. Each driver can be formed entirely of the non-magnetically permeable material, or it can comprise a core 20 formed of a base metal, such as steel, encircled by a closely fitting, fixed sleeve 21 of aluminum or copper.

Figure 3:
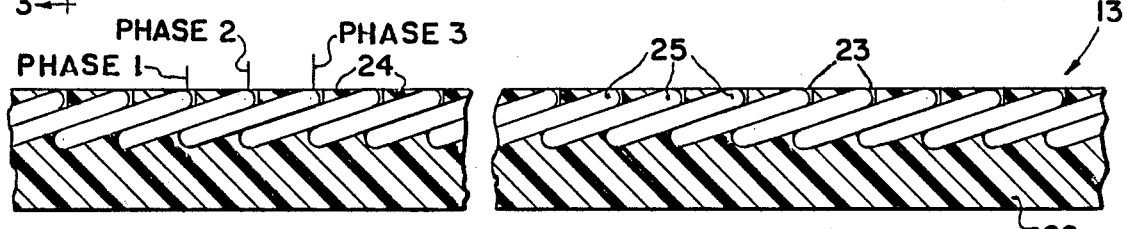
FIG. 3 is a sectional view taken on the line 3—3 of FIG. 2.

The primary member 13 of the linear induction motor M includes a core member 22 positioned within a housing and composed, for example, of stacked, laminated, silicon-steel strips having vertical slots 23 therein forming longitudinally spaced poles 24 as is conventional. Coils 25 of electrically conductive wire, such as copper, are wound on the core 22 and accommodated in the slots 23 in three-phase, multi-pole configuration as shown in FIG. 3. The coils 25 are alternated with respect to their phase relationship so that, in a direction longitudinally of the member 13, a phase 1 coil is followed by a phase 2 coil, a phase 2 coil is followed by a phase 3 coil, a phase 3 coil is followed by a phase 1 coil, and so forth.

The particular primary member disclosed has a pole pitch of about 5.715 cm (2.25 in.) and a length selected to suit the needs of a particular application. The width of the primary member preferably is less than the length of the drivers 12, thereby enabling the latter to extend beyond opposite sides of the primary as shown in FIG. 2 to enable flux at opposite sides of the primary to be utilized.

Additional information regarding the composition, function, and operation of such a primary member can be found in an article entitled "The Nature of Linear Induction Motors" and which appeared in *Machine Design* magazine (Aug. 23, 1984), which article is incorporated herein by reference.

The primary member 13 of the linear induction motor M should be positioned in close, overlying or underlying proximity to the drivers 12, as is shown in FIG. 2. However, there should be sufficient space between the primary and the drivers to provide rotational clearance therebetween, but such space should not be so great as to prevent driving of the rollers. In practice, a clearance or air gap of about 0.0889 cm (0.0625) or less is satisfactory. Larger clearances will impair the efficiency of the system, and a clearance in excess of about 0.635 cm (0.250 in.) may result in unsatisfactory performance.

The use of drivers is not essential; the primary 13 could be positioned adjacent the rollers themselves. The use of drivers, however, permits a variety of otherwise electrically unsuitable materials to be used for the conveyor rollers and also enables adequate driving torque to be obtained even in those instances in which the diameter of the rollers may be too small for optimum results.

An adjustable frequency and voltage control unit 26 couples the primary 13 to a source of power, such as three-phase, 220 or 440 V, 60 Hz, AC power, and controls the frequency and voltage of power supplied to the primary member. A suitable control unit is a Parajust GX AC motor speed control manufactured by Parametrics, Orange, Connecticut, and is coupled electrically to the primary member 13 in accordance with conventional practice to vary the cyclical supply of power to the coils 25, and hence the speed with which a magnetic wave is propagated along the primary member 13. The control unit 26 also may incorporate a reversing switch RS of conventional construction to change the direction in which the magnetic wave is propagated along the primary member 13. The control unit 26 may be one which enables the driving torque imparted to the rollers also to be varied by variation of the output frequency of the control unit.

In operation, an object 27 supported on the conveyor and of such length as to span two or more of the rollers 11 may be conveyed along the conveyor in one direction or another by appropriate control of the linear induction motor M. As the output of the control unit 26 effects propagation of a magnetic wave in one direction along the primary member 13, an interaction of magnetic flux and current between the primary member 13 and the secondary members, i.e., the drivers 12, induces rotation of the rollers in one direction as is indicated by the arrow 28 in FIG. 4. Objects 27 supported on the conveyor rollers 11 will be moved in the direction 29.

When an object 27 engages a stop or barrier 30 that is movable into and out of the path of movement of the object, movement of the latter will be arrested. The static weight of the arrested object will prevent rotation of the rollers directly supporting it. However, the remaining rollers will continue to rotate, thereby enabling other objects supported on the conveyor to continue their movement.

If desired, the operator may adjust the control unit 26 by means of the reversing switch RS to cause the magnetic wave to be propagated in the opposite direction along the primary member 13. This will cause the drivers 12 to rotate in the opposite direction, as shown by the arrow 31 in FIG. 4, and thereby cause objects supported on the conveyor to move in the opposite direction 32.

The operator may adjust the frequency or voltage of the output of the control unit 26 to control the rate of propagation of the magnetic field, thereby controlling the speed and torque of the rollers 11.

Figure 5:
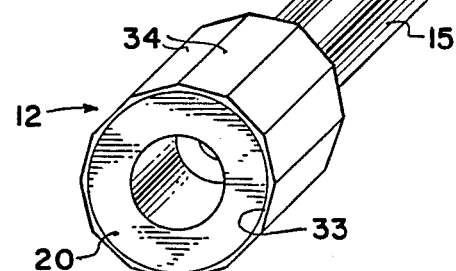
FIG. 5 is a view similar to FIG. 4, but illustrating another embodiment of the roller and driver unit.

In an alternative embodiment shown in FIG. 5, the core 20 of each driver 12 is encircled by an electrically conductive, non-magnetically permeable sleeve 33 the periphery of which is provided with a plurality of circumferentially spaced, substantially uniform area planar surfaces 34. As a result, at a plurality of successive points in the rotation of each driver a planar surface 34 will be parallel to the upper surface of the primary 13, thereby providing a substantially greater surface area for exposure to the magnetic flux. This relationship provides greater driving torque to the driver.

When using a driver like that shown in FIG. 5 care should be taken to provide a sufficient number of planar surfaces to prevent the presence of too great an air gap between the driver and the primary when a planar surface parallels the primary. The provision of eight such planar surfaces appears to be an appropriate minimum.

The embodiments disclosed are representative of presently preferred forms of the invention, but are intended to be illustrative rather than definitive thereof. The invention defined in the claims.

I claim:

1. A power and free roller conveyor comprising a linear induction motor having one primary and a secondary constituted by a plurality of freely rotatable rollers together forming a length of conveyor path; means mounting each of said rollers in spaced relation longitudinally of said path and for rotation about its own axis and closely adjacent but spaced from said primary by an air gap; and means for cyclically propagating magnetic flux in one direction along said primary longitudinally of said path, said air gap providing clearance between said primary and each of said plurality of rollers and being sufficiently small that the propagation of said magnetic flux results in an interaction of flux and current between said primary and said plurality of rollers sufficient to effect concurrent rotation in one direction of said plurality of rollers.

2. The conveyor according to claim 1 including means for varying the speed of rotation of said rollers.

3. The conveyor according to claim 1 including directional control means for controlling the direction of rotation of said rollers.

4. The conveyor according to claim 1 including means for varying the driving torque applied to said rollers.

5. The conveyor according to claim 1 wherein each of said rollers includes a driver adjacent said primary.

6. The conveyor according to claim 5 wherein each of said drivers has a cylindrical periphery.

7. The conveyor according to claim 5 wherein each of said drivers is coaxial with its associated roller.

8. The conveyor according to claim 1 wherein said linear induction motor is operable on three-phase alternating current electrical power.

9. The conveyor according to claim 1 including means for varying the frequency of propagation of said flux.

10. The conveyor according to claim 1 including means for changing the direction of propagation of said flux.

11. The conveyor according to claim 1 wherein each of said rollers has a driver overlying said primary, each of said drivers being formed of electrically conductive, non-magnetically permeable material.

12. The conveyor according to claim 1 wherein each of said rollers has a driver overlying said primary, each of said drivers comprising a core encircled by a sleeve formed of electrically conductive, non-magnetically permeable material.

13. The conveyor according to claim 1 wherein the size of said air gap is not more than about 0.635 cm.

14. The conveyor according to claim 1 wherein the size of said air gap is between about 0.0889 cm and 0.635 cm.

15. The conveyor according to claim 1 wherein each of said rollers extends beyond opposite sides of said primary.

16. A power and free roller conveyor comprising a linear induction motor having a primary and a secondary, said secondary comprising a plurality of rollers together forming a conveyor path, each of said rollers having a driver adjacent said primary, and each of said drivers having a plurality of circumferentially spaced, substantially planar surfaces on its periphery; means mounting each of said rollers in spaced relation longitudinally of said path and for rotation about its own axis and closely adjacent but spaced from said primary by an air gap; and means for cyclically propagating magnetic flux in one direction along said primary, said air gap providing clearance between said primary and said rollers and being sufficiently small that the propagation of said magnetic flux results in an interaction of flux and current between said primary and said rollers sufficient to effect rotation in one direction of said rollers.

17. The conveyor according to claim 16 wherein each of said drivers has at least eight of said planar surfaces.

* * * * *